United States Patent
Hwang et al.

(10) Patent No.: US 9,674,822 B2
(45) Date of Patent: Jun. 6, 2017

(54) METHOD AND APPARATUS FOR TRANSMITTING CONTROL INFORMATION

(71) Applicant: LG ELECTRONICS INC., Seoul (KR)

(72) Inventors: Daesung Hwang, Anyang-si (KR); Dongyoun Seo, Anyang-si (KR); Bonghoe Kim, Anyang-si (KR); Joonkui Ahn, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 118 days.

(21) Appl. No.: 14/380,263

(22) PCT Filed: Feb. 22, 2013

(86) PCT No.: PCT/KR2013/001455
§ 371 (c)(1),
(2) Date: Aug. 21, 2014

(87) PCT Pub. No.: WO2013/125908
PCT Pub. Date: Aug. 29, 2013

(65) Prior Publication Data
US 2015/0043462 A1    Feb. 12, 2015

Related U.S. Application Data

(60) Provisional application No. 61/602,025, filed on Feb. 22, 2012, provisional application No. 61/611,579, filed on Mar. 16, 2012, provisional application No. 61/637,832, filed on Apr. 24, 2012, provisional application No. 61/648,583, filed on May 17, 2012.

(51) Int. Cl.
*H04L 1/16*  (2006.01)
*H04W 72/04*  (2009.01)
*H04L 1/00*  (2006.01)

(52) U.S. Cl.
CPC ....... *H04W 72/0413* (2013.01); *H04L 1/0026* (2013.01); *H04L 1/0057* (2013.01); *H04L 1/0073* (2013.01); *H04L 1/1671* (2013.01)

(58) Field of Classification Search
None
See application file for complete search history.

(56) References Cited

U.S. PATENT DOCUMENTS

2002/0075838 A1*  6/2002  Choi .................... H04L 1/0025
370/342
2002/0154618 A1   10/2002  Kim et al.
(Continued)

FOREIGN PATENT DOCUMENTS

KR    10-2002-0031554 A    5/2002
KR    10-2010-0126857 A    12/2010
(Continued)

*Primary Examiner* — Hassan Phillips
*Assistant Examiner* — Ayanah George
(74) *Attorney, Agent, or Firm* — Birch, Stewart, Kolasch & Birch, LLP

(57) ABSTRACT

A method and an apparatus for transmitting uplink control information in a wireless communication system are provided. A first Reed-Muller (RM) encoder encodes first uplink control information on the basis of a first RM basis, and a second RM encoder encoded second uplink control information on the basis of a second RM basis.

13 Claims, 18 Drawing Sheets

(56) References Cited

U.S. PATENT DOCUMENTS

| | | |
|---|---|---|
| 2009/0221289 A1 | 9/2009 | Xu et al. |
| 2011/0080876 A1* | 4/2011 | Yin .................. H03M 13/6525 370/329 |
| 2012/0195265 A1 | 8/2012 | Kim et al. |
| 2012/0210187 A1* | 8/2012 | Yin .................... H03M 13/136 714/751 |
| 2013/0117622 A1* | 5/2013 | Blankenship ....... H03M 13/136 714/751 |
| 2013/0208670 A1 | 8/2013 | Chen et al. |

FOREIGN PATENT DOCUMENTS

| | | |
|---|---|---|
| KR | 10-2011-0039154 A | 4/2011 |
| WO | WO 2009/123935 A2 | 10/2009 |
| WO | WO 2012/016516 A1 | 2/2012 |

* cited by examiner

METHOD AND APPARATUS FOR TRANSMITTING CONTROL INFORMATION

CROSS REFERENCE TO RELATED APPLICATIONS

This application is the National Phase of PCT International Application No. PCT/KR2013/001455, filed on Feb. 22, 2013, which claims priority under 35 U.S.C. 119(e) to U.S. Provisional Application Nos. 61/602,025, filed on Feb. 22, 2012, 61/611,579, filed on Mar. 16, 2012, 61/637,832, filed on Apr. 24, 2012 and 61/648,583, filed on May 17, 2012, all of which are hereby expressly incorporated by reference into the present application.

BACKGROUND OF THE INVENTION

Field of the Invention

The present invention relates to wireless communications, and more particularly, to a method and apparatus for transmitting control information in a wireless communication system.

Related Art $3^{rd}$ generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-Advanced (LTE-A) evolved from the 3GPP LTE.

As disclosed in 3GPP TS 36.211 V10.4.0 (2011-12) "Evolved Universal Terrestrial Radio Access (E-UTRA); Physical Channels and Modulation (Release 10)", a physical channel of the LTE can be classified into a downlink channel, i.e., a physical downlink shared channel (PDSCH) and a physical downlink control channel (PDCCH), and an uplink channel, i.e., a physical uplink shared channel (PUSCH) and a physical uplink control channel (PUCCH).

The uplink channel is used to transmit a variety of uplink control information such as hybrid automatic repeat request (HARQ) positive-acknowledgement (ACK)/negative-acknowledgement (NACK), channel state information (CSI), and scheduling request (SR).

A radio resource for the uplink channel may be more restrictive than a radio resource for the downlink channel, and a transmission error of uplink control information may aggravate service quality. Such a fact must be considered when the uplink channel is designed.

SUMMARY OF THE INVENTION

The present invention provides a method of transmitting uplink control information and a wireless device using the method.

In an aspect, a method for transmitting uplink control information in a wireless communication system is provided. The method includes encoding first uplink control information on the basis of a first Reed-Muller (RM) basis by a first RM encoder, encoding second uplink control information on the basis of a second RM basis by a second RM encoder, generating multiplexed control information by multiplexing the encoded first and second uplink control information, and transmitting the multiplexed control information through an uplink channel.

The first RM basis and the second RM basis may be acquired by extending a reference RM basis.

The first RM basis may be acquired by circularly repeating the reference RM basis.

The second RM basis may be acquired by adding zero padding to the reference RM basis.

In another aspect, an apparatus for transmitting uplink control information in a wireless communication system is provided. The apparatus includes a radio frequency (RF) unit for transmitting and receiving a radio signal, and a processor coupled to the RF unit. The processor instructs the RF unit to perform operations of encoding first uplink control information on the basis of a first Reed-Muller (RM) basis by a first RM encoder, encoding second uplink control information on the basis of a second RM basis by a second RM encoder, generating multiplexed control information by multiplexing the encoded first and second uplink control information, and transmitting the multiplexed control information through an uplink channel.

Transmission reliability of a variety of uplink control information can be improved.

DESCRIPTION OF EXEMPLARY EMBODIMENTS

A wireless device may be fixed or mobile, and may be referred to as another terminology, such as a user equipment (UE), a mobile station (MS), a user terminal (UT), a subscriber station (SS), a mobile terminal (MT), etc. A base station (BS) is generally a fixed station that communicates with the wireless device and may be referred to as another terminology, such as an evolved node-B (eNB), a base transceiver system (BTS), an access point, etc.

Hereinafter, the present invention is applied based on a $3^{rd}$ generation partnership project (3GPP) long term evolution (LTE) or a 3GPP LTE-Advanced (LTE-A). This is for exemplary purposes only, and thus the present invention is applicable to various communication systems. In the following description, LTE and/or LTE-A are collectively referred to as LTE.

The wireless device may be served by a plurality of serving cells. Each serving cell may be defined with a downlink (DL) component carrier (CC) or a pair of a DL CC and an uplink (UL) CC.

The serving cell can be classified into a primary cell and a secondary cell. The primary cell operates at a primary frequency, and is a cell designated as the primary cell when the UE performs an initial network entry process or starts a network re-entry process or performs a handover process. The primary cell is also called a reference cell. The secondary cell operates at a secondary frequency. The secondary cell can be configured after an RRC connection is established, and can be used to provide an additional radio resource. At least one primary cell is configured always. The secondary cell can be added/modified/released by using higher-layer signaling (e.g., RRC messages).

The CI of the primary cell may be fixed. For example, a lowest CI can be designated as a CI of the primary cell. It is assumed hereinafter that the CI of the primary cell is 0 and a CI of the secondary cell is allocated sequentially starting from 1.

Figure 1:
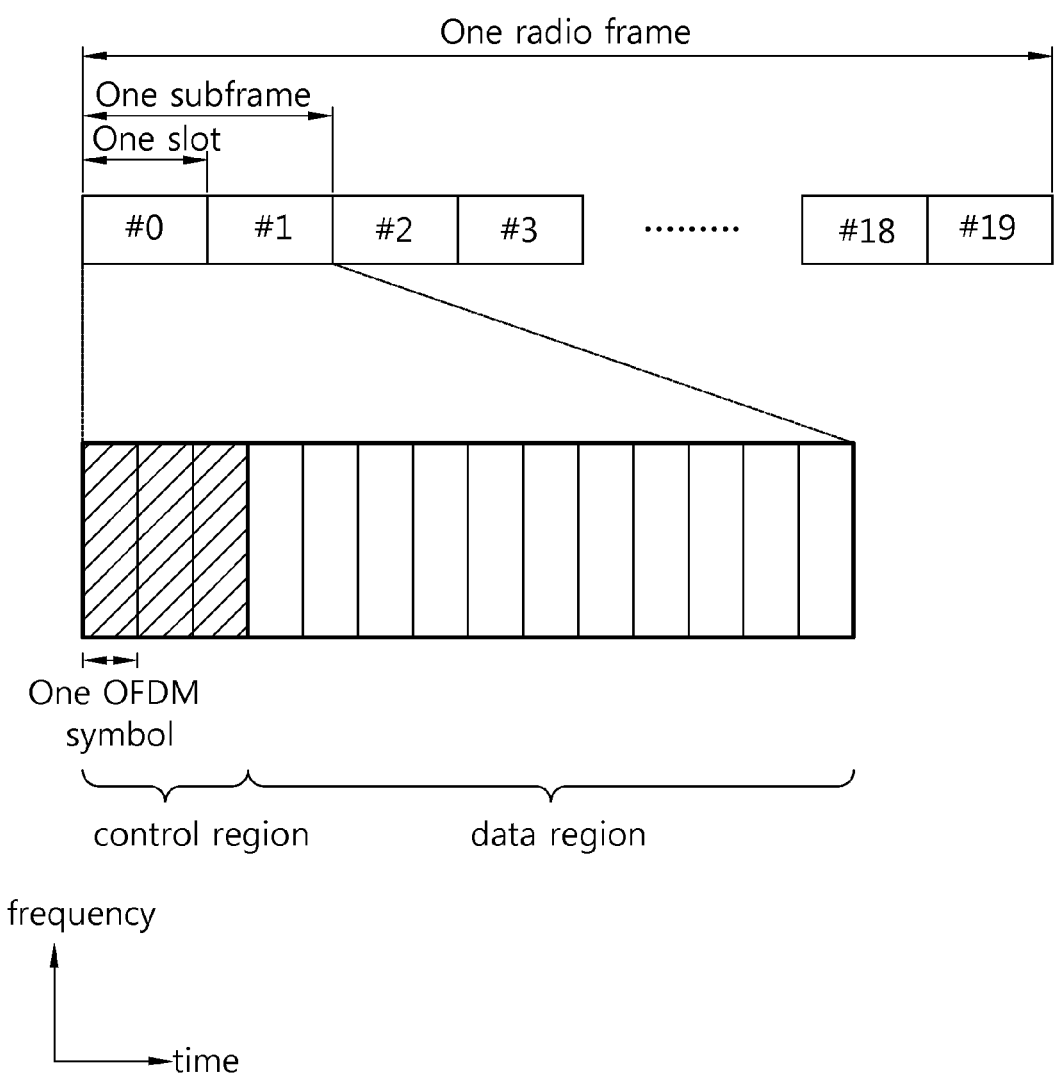
FIG. 1 shows a structure of a downlink (DL) radio frame in 3GPP LTE.

FIG. 1 shows a structure of a downlink (DL) radio frame in 3GPP LTE. The section 4 of 3GPP TS 36.211 V10.4.0 (2011-12) "Evolved Universal Terrestrial Radio Access (E-UTRA); Physical Channels and Modulation (Release 10)" may be incorporated herein by reference.

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V10.4.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB may include 7×12 resource elements (REs).

A DL subframe is divided into a control region and a data region in the time domain. The control region includes up to $1^{st}$ four OFDM symbols of a $1^{st}$ slot in the subframe. However, the number of OFDM symbols included in the control region may vary. A physical downlink control channel (PDCCH) and other control channels are allocated to the control region, and a physical downlink shared channel (PDSCH) is allocated to the data region.

As disclosed in 3GPP TS 36.211 V10.4.0, in 3GPP LTE, a physical channel may be classified into a data channel, i.e., a physical downlink shared channel (PDSCH) and a physical uplink shared channel (PUSCH), and a control channel, i.e., a physical downlink control channel (PDCCH), a physical control format indicator channel (PCFICH), a physical hybrid-ARQ indicator channel (PHICH), and a physical uplink control channel (PUCCH).

The PCFICH transmitted in a $1^{st}$ OFDM symbol of the subframe carries a control format indicator (CFI) regarding the number of OFDM symbols (i.e., a size of the control region) used for transmission of control channels in the subframe. A wireless device first receives the CFI on the PCFICH, and thereafter monitors the PDCCH.

Unlike the PDCCH, the PCFICH does not use blind decoding, and is transmitted by using a fixed PCFICH resource of the subframe.

The PHICH carries a positive-acknowledgement (ACK)/negative-acknowledgement (NACK) signal for an uplink (UL) hybrid automatic repeat request (HARQ). The ACK/NACK signal for UL data on a PUSCH transmitted by the wireless device is transmitted on the PHICH.

A physical broadcast channel (PBCH) is transmitted in first four OFDM symbols in a $2^{nd}$ slot of a $1^{st}$ subframe of a radio frame. The PBCH carries system information necessary for communication between the wireless device and a BS. The system information transmitted through the PBCH is referred to as a master information block (MIB). In comparison thereto, system information transmitted on the PDCCH is referred to as a system information block (SIB).

Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group, and/or activation of a voice over Internet protocol (VoIP).

In 3GPP LTE, blind decoding is used to detect a PDCCH. The blind decoding is a scheme in which a desired identifier is de-masked from a cyclic redundancy check (CRC) of a received PDCCH (referred to as a candidate PDCCH) to determine whether the PDCCH is its own control channel by performing CRC error checking. The BS determines a PDCCH format according to DCI to be transmitted to a wireless device, attaches a cyclic redundancy check (CRC) to control information, and masks a unique identifier (referred to as a radio network temporary identifier (RNTI)) to the CRC according to an owner or usage of the PDCCH.

According to 3GPP TS 36.211 V10.4.0, an uplink channel includes a PUSCH, a PUCCH, a sounding reference signal (SRS), and a physical random access channel (PRACH).

Figure 2:
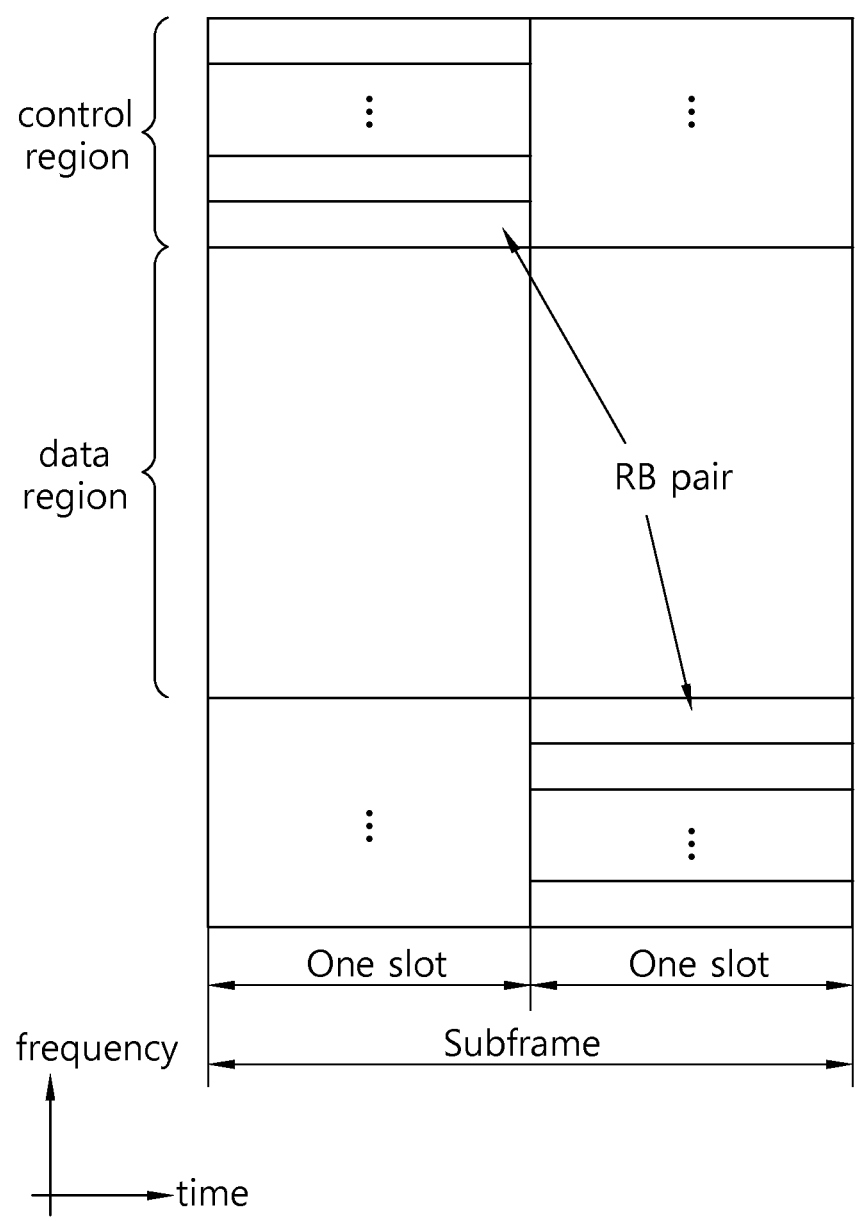
FIG. 2 shows a structure of an uplink (UL) subframe in 3GPP LTE.

FIG. 2 shows a structure of an uplink (UL) subframe in 3GPP LTE.

The UL subframe can be divided into a control region and a data region in a frequency domain. The control region is a region to which a physical uplink control channel (PUCCH) is allocated. The data region is a region to which a physical uplink shared channel (PUSCH) is allocated.

The PUCCH is allocated in an RB pair in a subframe. RBs belonging to the RB pair occupy different subcarriers in each of a $1^{st}$ slot and a $2^{nd}$ slot. m is a location index indicating a logical frequency-domain location of the RB pair allocated to the PUCCH in the subframe. It shows that RBs having the same value m occupy different subcarriers in the two slots.

The PUSCH is allocated by a UL grant the PDCCH. Although not shown, a $4^{th}$ OFDM symbol of each slot of a normal CP is used in demodulation reference signal (DM RS) transmission.

Uplink control information (UCI) includes HARQ ACK/NACK, channel state information (CSI), and scheduling request (SR). Hereinafter, as an indicator for indicating a state of a DL channel, the CSI may include any one of a channel quality indicator (CQI) and a precoding matrix indicator (PMI).

Various methods are used for UCI transmission.

First, UCI may be transmitted alone or together with a UL transport block through a PUSCH. This is called UCI multiplexing.

Figure 3:
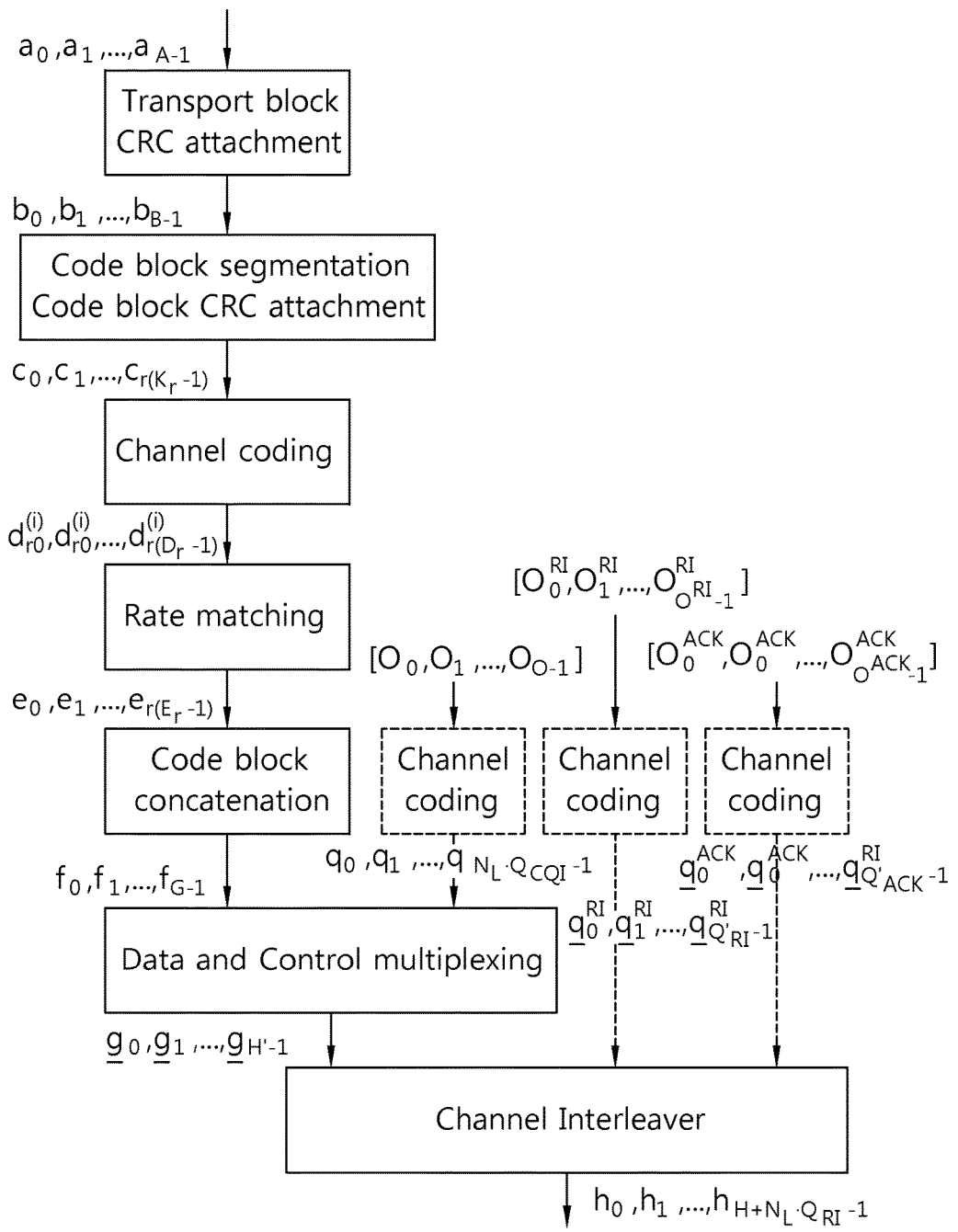
FIG. 3 shows an example of UCI multiplexing for PUSCH transmission in 3GPP LTE.

FIG. 3 shows an example of UCI multiplexing for PUSCH transmission in 3GPP LTE. The section 5 of 3GPP TS 36.212 V10.4.0 (2011-42) "Evolved Universal Terrestrial Radio Access (E-UTRA); Multiplexing and channel coding (Release 10)" may be incorporated herein by reference.

Data bits $a_0, a_1, \ldots, a_{A-1}$ are provided in every TTI in a format of one transport block. First, cyclic redundancy check (CRC) parity bits $p_0, p_1, \ldots, p_{L-1}$ are attached to the data bits $a_0, a_1, \ldots, a_{A-1}$ to generate CRC-attached bits $b_0, b_1, \ldots, b_{B-1}$. Herein, B=A+L.

The CRC-attached bits $b_0, b_1, \ldots, b_{B-1}$ are segmented in a code block unit, and the CRC parity bits are re-attached in the code block unit. $c_{r0}, c_{r1}, \ldots, c_{r(K_r-1)}$ denote a bit sequence output after the code block segmentation. Herein, if the total number of code blocks is C, r denotes a code block number, and Kr denotes the number of bits for the code block number r.

Channel coding is performed on a bit sequence for a given code block. $d^{(i)}_0, d^{(i)}_1, \ldots, d^{(i)}_{D-1}$ denote encoded bits, D denotes the number of encoded bits for each output stream, and i denotes an index of a bit stream output from an encoder.

Rate matching is performed on the encoded bits. Then, code block concatenation is performed on the rate-matched bits. As a result, a data bit sequence $f_0, f_1, \ldots, f_{G-1}$ is generated. Herein, G denotes the total number of encoded bits used to transmit bits other than bits used in control information transmission when the control information is multiplexed on a PUSCH.

The UCI is coded independently in a format of CSI, rank indicator (RI), and HARQ ACK/NACK.

Hereinafter, CSI coding is described.

Channel coding is performed on CQI $o_0, o_1, \ldots, o_{O-1}$ (where O is the number of CQI bits) to generate a control information bit sequence $q_0, q_1, \ldots, q_{Q-1}$. $N_L$ is the number of layers to which a corresponding UL transport block is mapped, and $Q_{CQI}$ is the number of bits per layer that can be used for the CSI.

For example, a (32, O) block code (also referred to as a Reed-Muller (RM) code) may be used as channel coding for the CQI.

$b_0, b_1, \ldots, b_{31}$ denote an intermediate sequence for CQI channel coding and can be generated by the following equation.

$$b_i = \sum_{n=0}^{O-1} (o_n \cdot M_{i,n}) \bmod 2 \quad [\text{Equation 1}]$$

Herein, i=0, 1, . . . , 31. $M_{i,n}$ is a basis sequence for the (32, O) block code, and may be defined as the following table.

TABLE 1

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0 | 1 | 1 | 0 | 0 | 0 | 0 | 0 | 0 | 0 | 0 | 1 |
| 1 | 1 | 1 | 1 | 0 | 0 | 0 | 0 | 0 | 0 | 1 | 1 |
| 2 | 1 | 0 | 0 | 1 | 0 | 0 | 1 | 0 | 1 | 1 | 1 |
| 3 | 1 | 0 | 1 | 1 | 0 | 0 | 0 | 0 | 1 | 0 | 1 |
| 4 | 1 | 1 | 1 | 1 | 0 | 0 | 0 | 1 | 0 | 0 | 1 |
| 5 | 1 | 1 | 0 | 0 | 1 | 0 | 1 | 1 | 1 | 0 | 1 |
| 6 | 1 | 0 | 1 | 0 | 1 | 0 | 1 | 0 | 1 | 1 | 1 |
| 7 | 1 | 0 | 0 | 1 | 1 | 0 | 0 | 1 | 1 | 0 | 1 |
| 8 | 1 | 1 | 0 | 1 | 1 | 0 | 0 | 1 | 0 | 1 | 1 |
| 9 | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 1 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 1 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |
| 21 | 1 | 1 | 0 | 1 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 0 | 1 | 1 | 1 |
| 24 | 1 | 1 | 1 | 1 | 0 | 1 | 1 | 1 | 1 | 1 | 0 |
| 25 | 1 | 1 | 0 | 0 | 0 | 1 | 1 | 1 | 0 | 0 | 1 |
| 26 | 1 | 0 | 1 | 1 | 0 | 1 | 0 | 0 | 1 | 1 | 0 |
| 27 | 1 | 1 | 1 | 1 | 0 | 1 | 0 | 1 | 1 | 1 | 0 |
| 28 | 1 | 0 | 1 | 0 | 1 | 1 | 1 | 0 | 1 | 1 | 0 |
| 29 | 1 | 0 | 1 | 1 | 1 | 1 | 1 | 1 | 1 | 0 | 0 |

TABLE 1-continued

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0 |

The control information bit sequence $q_0, q_1, \ldots, q_{Q-1}$ is generated by circularly repeating the intermediate sequence $b_0, b_1, \ldots, b_{31}$ according to the following equation.

$$q_i = b_{(i \bmod 32)} \quad \text{[Equation 2]}$$

Herein, $i=0, 1, \ldots, N_L Q_{CQI}-1$.

A data bit sequence $f_0, f_1, \ldots, f_{G-1}$ and the CSI bit sequence are multiplexed into a multiplexed symbol sequence $g_0, g_1, \ldots, g_{H'-1}$. In the multiplexed symbol sequence, the CSI may be first arranged, and thereafter a UL transport block may be arranged. H denotes the total number of bits allocated to the PUSCH, and is defined as $H=G+N_L Q_{CQI}$. Herein, $q_i$ is a modulation symbol on constellation, and $H'=H/Q_m$. $Q_m$ denotes the number of bits for each modulation symbol for a modulation scheme. For example, when quadrature phase shift keying (QPSK) is used as the modulation scheme, $Q_m=2$.

The channel interleaver implements time-first mapping of a modulation symbol of the PUSCH.

Now, UCI transmission through a PUCCH is described.

The PUCCH is used only for UCI transmission. For this, the PUCCH supports multiple for mats. A PUCCH having a different number of bits per subframe can be used according to a modulation scheme which is dependent on the PUCCH format. The PUCCH format 1 is used for transmission of an SR. The PUCCH formats 1a/1b is used for transmission of an ACK/NACK signal. The PUCCH format 2 is used for transmission of a CQI. The PUCCH formats 2a/2b is used for simultaneous transmission of the CQI and the ACK/NACK signal. When only the ACK/NACK signal is transmitted in a subframe, the PUCCH formats 1a/1b is used. When the SR is transmitted alone, the PUCCH format 1 is used. When the SR and the ACK/NACK are simultaneously transmitted, the PUCCH format 1 is used, and in this transmission, the ACK/NACK signal is modulated by using a resource allocated to the SR.

Channel coding for the PUCCH format 2 is as follows.

UCI (e.g., CSI) $u_0, u_1, \ldots, u_{A-1}$ (where A is the number of bits of the UCI) is subjected to channel coding to generate an encoded bit sequence $b_0, b_1, \ldots, b_{B-1}$. B is the number of bits capable of transmitting a corresponding PUCCH. Since the PUCCH format 2 can transmit 20-bit coded UCI, B=20.

A (20, A) block code (or Reed-Muller (RM) code) may be used as channel coding for the PUCCH format 2. This can be expressed as follows.

$$b_i = \sum_{n=0}^{A-1} (u_n \cdot M_{i,n}) \bmod 2 \quad \text{[Equation 3]}$$

Herein, $i=0, 1, \ldots, B-1$. $M_{i,n}$ is a basis sequence for a (20, A) block code, and may be defined as the following table.

TABLE 2

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 1 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 1 | 0 | 1 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

Figure 4:
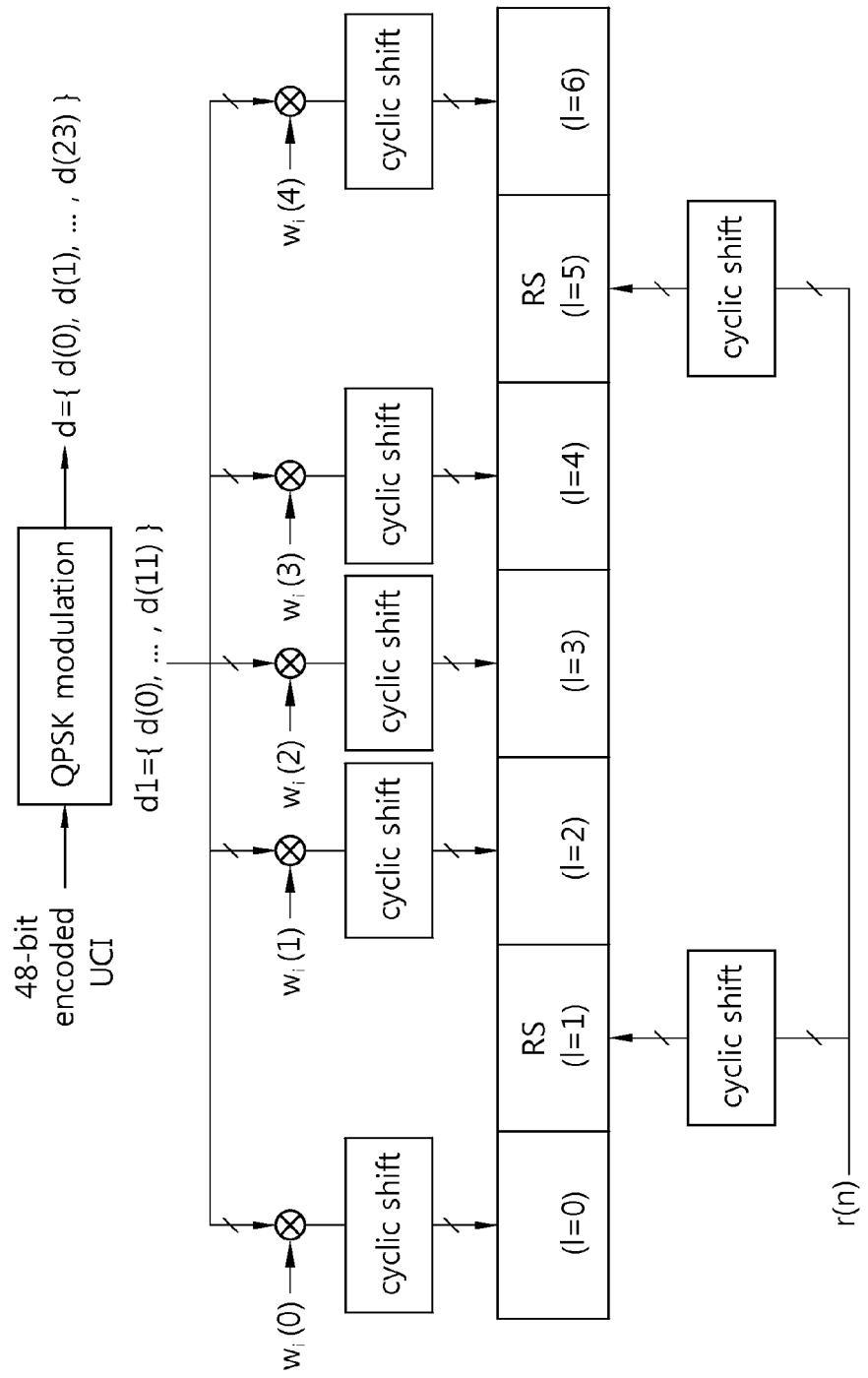
FIG. 4 shows an example of a structure of a PUCCH format 3 in a normal CP case.

FIG. 4 shows an example of a structure of a PUCCH format 3 in a normal CP case.

In preparation for a case where the number of bits required for UCI transmission is insufficient with the use of a plurality of serving cells, the PUCCH format 3 is additionally introduced in addition to a PUCCH format of the existing 3GPP LTE PUCCH.

One slot includes 7 OFDM symbols. l denotes an OFDM symbol number in the slot, and has a value in the range of 0 to 6. Two OFDM symbols with l=1, 5 are used as RS OFDM symbols for a reference signal, and the remaining OFDM symbols are used as data OFDM symbols for the UCI.

A symbol sequence $d=\{d(0), d(1), \ldots, d(23)\}$ is generated by performing QPSK modulation on a 48-bit encoded UCI (e.g., ACK/NACK). $d(n)(n=0, 1, \ldots, 23)$ are complex-valued modulation symbols. The symbol sequence d can be regarded as a set of modulation symbols. The number of bits of the UCI or a modulation scheme is for exemplary purposes only, and thus the present invention is not limited thereto.

One PUCCH uses one RB, and one subframe includes a first slot and a second slot. A symbol sequence d={d(0), d(1), . . . , d(23)} is divided into two sequences d1={d(0), . . . , d(11)} and d2={d(12), . . . , d(23)}, each having a length of 12. The first sequence d1 is transmitted in the first slot, and the second sequence d2 is transmitted in the second slot. In FIG. 4, the first sequence d1 is transmitted in the first slot.

The symbol sequence is spread with an orthogonal sequence $w_i$. Symbol sequences correspond to respective data OFDM symbols. An orthogonal sequence is used to identify a PUCCH (or UE) by spreading the symbol sequence across the data OFDM symbols.

The orthogonal sequence has a spreading factor K=5, and includes five elements. As the orthogonal sequence, one of five orthogonal sequences of the following table can be selected in accordance with an orthogonal sequence index i.

TABLE 3

| Index (i) | $[w_i(0), w_i(1), w_i(2), w_i(3), w_i(4)]$ |
| --- | --- |
| 0 | $[+1, +1, +1, +1, +1]$ |
| 1 | $[+1, e^{j2\pi/5}, e^{j4\pi/5}, e^{j6\pi/5}, e^{j8\pi/5}]$ |
| 2 | $[+1, e^{j4\pi/5}, e^{j8\pi/5}, e^{j2\pi/5}, e^{j6\pi/5}]$ |
| 3 | $[+1, e^{j6\pi/5}, e^{j2\pi/5}, e^{j8\pi/5}, e^{j4\pi/5}]$ |
| 4 | $[+1, e^{j8\pi/5}, e^{j6\pi/5}, e^{j4\pi/5}, e^{j2\pi/5}]$ |

Two slots in the subframe can use different orthogonal sequence indices.

A reference signal sequence used for demodulation of the UCI is transmitted by being mapped to two RS OFDM symbols.

Channel coding for the PUCCH format 3 is as follows.

UCI (e.g., CSI) $u_0, u_1, \ldots, u_{A-1}$ (where A is the number of bits of the UCI) is subjected to channel coding to generate an encoded bit sequence $q_0, q_1, \ldots, q_{B-1}$. B is the number of bits capable of transmitting a corresponding PUCCH. Since the PUCCH format 3 can transmit coded UCI of 48 bits, B=48.

The PUCCH format 3 may transmit up to 48 bits, but channel coding uses a basis sequence for a (32, A) block code of Table 1. Therefore, according to whether the number A of UCI bits is greater than the number of RM bases (or also referred to as a basis sequence), coding is achieved as follows. According to Table 1, the number of RM bases is 11.

If A<=11, the following is satisfied.

An intermediary sequence $b_0, b_1, \ldots, b_{31}$ for channel coding is generated as follows.

$$b_i = \sum_{n=0}^{A-1} (u_n \cdot M_{i,n}) \bmod 2 \qquad \text{[Equation 4]}$$

Herein, i=0, 1, . . . , 31, and $M_{i,n}$ is a basis sequence for the (32, O) block code of Table 1.

A control information bit sequence $q_0, g_1, \ldots, g_{B-1}$ is generated by circularly repeating the intermediary sequence $b_0, b_1, \ldots, b_{31}$ as follows.

$$q_i = b_{(i \bmod 32)} \qquad \text{[Equation 5]}$$

Herein, i=0, 1, . . . , B-1.

If 11<A<=21, the following is satisfied.

Two intermediary sequences $b^1_i$ and $b^2_i$ are generated as follows.

$$b^1_i = \sum_{n=0}^{\lceil A/2 \rceil - 1} (u_n \cdot M_{i,n}) \bmod 2, \qquad \text{[Equation 6]}$$

$$b^2_i = \sum_{n=0}^{A - \lceil A/2 \rceil - 1} (u_{\lceil A/2 \rceil + n} \cdot M_{i,n}) \bmod 2$$

Herein, i=0, 1, . . . , 23.

The control information bit sequence $q_0, g_1, \ldots, g_{B-1}$ is obtained by concatenating the intermediary sequences.

$$q_i = b^1_j, q_{i+1} = b^1_{j+1}, q_{i+2} = b^2_j, q_{i+4} = b^2_{j+1} \qquad \text{[Equation 7]}$$

If A<=11, since one RM block code is used, this is called a single RM. If A>11, since two RM block codes are used, this is called a dual RM.

Now, UCI transmission is described according to an embodiment of the present invention.

Hereinafter, $1^{st}$ UCI is referred to as HARQ ACK/NACK (hereinafter, simply referred to as HARQ ACK or A/N), and $2^{nd}$ UCI is referred to as CSI, and this is for exemplary purposes only.

The HARQ ACK and the CSI may include UCI for one or more serving cells. For example, if the HARQ ACK is 10 bits, 2 bits may include ACK for a primary cell, and the remaining bits may include ACK for a secondary cell. 1-bit HARQ ACK may indicate ACK or NACK for one DL packet. Alternatively, 1-bit HARQ ACK may indicate bundled ACK or multiplexed ACK. ACK bundling is for combining ACK/NACK bits for a plurality of data packets by using a logical AND operation. Spatial bundling is for bundling ACK/NACK for a plurality of codewords when the plurality of codewords is received within one PDSCH. Time-domain bundling is for bundling ACK/NACK for a plurality of data packets received in different subframes. Frequency-domain bundling is for bundling ACK/NACK for a plurality of data packets received in different cells.

As a plurality of serving cells are introduced and as the number of UCI types is increased, it is necessary to transmit various types of UCI through one UL channel. For example, HARQ ACK and CSI may be transmitted simultaneously through a PUCCH. According to the existing PUCCH format 3 structure, the HARQ ACK and the CSI may be transmitted by being generated as one codeword (corresponding to a control information bit sequence). However, when using the existing structure, a coding scheme cannot be selected according to a type of UCI.

For example, a bit error rate (BER) requirement for HARQ ACK is higher in general than a BER requirement for CSI. This is because an HARQ ACK error may cause worse communication quality deterioration than a CSI error.

According to the proposed embodiment, it is proposed a method of selecting a coding scheme in consideration of different error requirements for two types of UCI when the UCI multiplexing is performed.

Although the following description is based on the structure of the PUCCH format 3 described in FIG. 4 and corresponding channel coding (i.e., single RM and dual RM), this is for exemplary purposes only. A channel may be changed to a PUSCH or other different channels, and thus the number of bits that can be transmitted may also be changed. Channel coding is described based on an RM code, but may also be applied to well-known other block codes.

Figure 5:
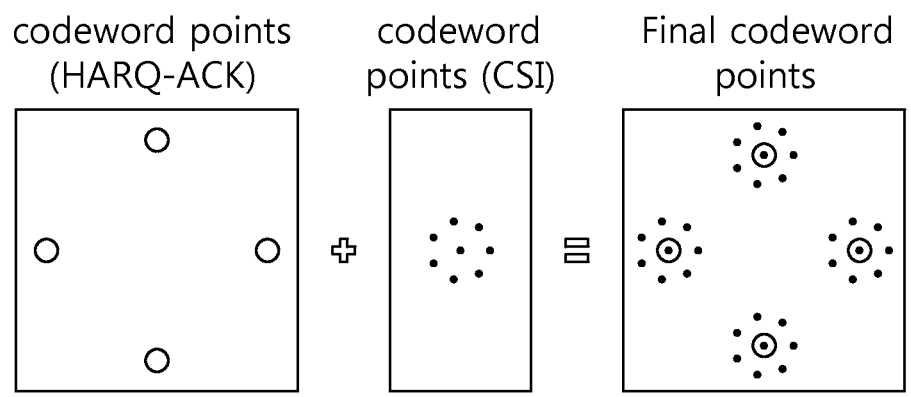
FIG. 5 shows an interference model based on joint coding of HARQ ACK and CSI.

FIG. 5 shows an interference model based on joint coding of HARQ ACK and CSI.

Joint coding refers to an operation in which HARQ ACK and CSI are subjected to encoding as one input to generate encoded UCI.

For example, a UCI bit sequence $u_0, u_1, \ldots, u_{A-1}$ which is an input of Equation 4 and Equation 6 may be defined as follows.

$$\{u_0, u_1, \ldots, u_{A-1}\} = \{AN_0, AN_1, \ldots, AN_{K-1}, CSI_0, CSI_1, \ldots\}, \quad (1)$$

$$\{u_0, u_1, \ldots, u_{A-1}\} = \{AN_0, CSI_0, AN_1, CSI_1, \ldots\} \quad (2)$$

Herein, ANi is an HARQ ACK bit, and CSIi is a CSI bit. In Example (1), the HARQ ACK bit is mapped to a low UCI bit index. In Equation (2), HARQ ACK and CSI are mapped alternately.

As expressed in the drawing, a final codeword of joint coding may be modeled as a sum of a codeword point corresponding to HARQ-ACK and a codeword point corresponding to CSI. From a perspective of the HARQ-ACK, the CSI may be interpreted as interference when decoding is performed.

When the interference is an inter-code interference, decoding performance for HARQ ACK can be prevented from being decreased due to the interference, if error correction capability of the CSI, which has lower importance, decreases. According to the conventional technique, the same RM bases of Table 1 are applied to the CSI and the HARQ ACK. The embodiment of the present invention proposes to use different RM bases of the CSI and the HARQ ACK, as described below.

The following is a criterion for selecting an RM basis for each UCI when there is a plurality of RM bases.

For example, a wireless device may select an RM basis corresponding to HARQ ACK according to a strong distance characteristic (e.g., a high minimum hamming distance, a high average hamming distance, and/or a weight accumulate function with a high ratio of a codeword having a high distance). Regarding an RM basis corresponding to CSI, an RM basis having a relatively weak distance characteristic may be selected other than an RM basis corresponding to the HARQ ACK.

For another example, the wireless device may select the RM basis such that a decoding error of HARQ ACK is minimized according to a predetermined noise variance.

The weight accumulate function may be determined to a distance value of which an index corresponds to a middle portion when a distance between codewords is sorted in a descending or ascending order. An RM basis to be selected may include the RM basis of Table 1 or Table 2, or may include well-known other RM bases.

Figure 6:
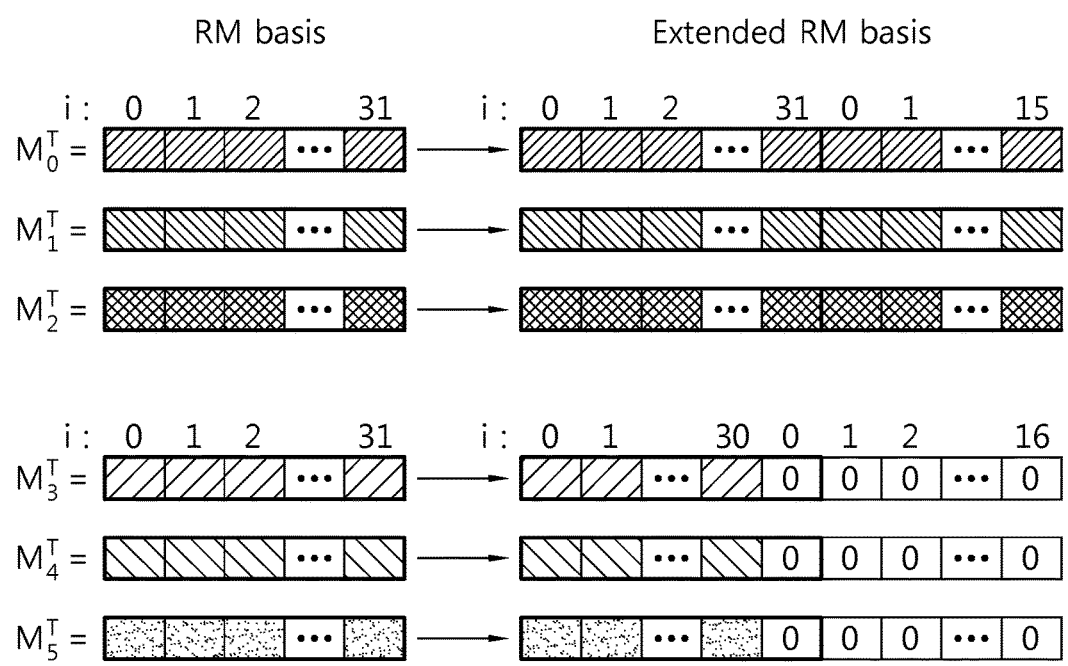
FIG. 6 shows an extension of an RM basis according to an embodiment of the present invention.

FIG. 6 shows an extension of an RM basis according to an embodiment of the present invention.

In order to decrease error correction capability of CSI, zero padding may be applied to an RM basis corresponding to CSI so that a dimension of the basis is reduced in practice. In addition, as to HARQ ACK, circular repetition may be applied to the RM basis.

To clarify the explanation, it is assumed that the number of HARQ-ACK bits is 3, and the number of CSI bits is 3. It is also assumed that $M_j$ is a j-th RM basis, $M_0, M_1, M_2$ are RM bases corresponding to HARQ-ACK, and $M_3, M_4, M_5$ are RM bases corresponding to CSI.

When the (32, A) block code of Table 1 is used, a length of a reference basis $M_j$ used as a reference is 32. According to an embodiment of the present invention, a basis extension value K is defined. Herein, it is assumed that K=16.

Therefore, the circular repetition is applied to $M_0, M_1, M_2$ so that a length of an RM basis corresponding to HARQ-ACK is an extended value, i.e., 32+16. For example, if $M_1$ corresponds to $M_{i,1}=\{1100\ 1100\ 1001\ 0101\ 1010\ 0101\ 1101\ 0010\}$ of Table 1, an extended RM basis to which the circular repetition is applied is $M_1'=\{1100\ 1100\ 1001\ 0101\ 1010\ 0101\ 1101\ 0010\ 1100\ 1100\ 1001\ 0101\}$.

RM bases $M_3, M_4, M_5$ corresponding to CSI are extended to an extended length, i.e., 32+16, and the zero padding is performed on a portion corresponding to last K bits. For example, if $M_3$ corresponds to $M_{i,3}=\{0011\ 1001\ 1100\ 1100\ 0110\ 0100\ 1011\ 0110\}$ of Table 1, an extended PM basis to which the zero padding is applied is $M_3'=\{1100\ 1100\ 1001\ 0101\ 1010\ 0101\ 1101\ 0010\ 1100\ 1100\ 1001\ 0100\ 0000\ 0000\ 0000\ 0000\}$. It is shown herein that the zero padding is added to a reference RM basis or some values of the reference RM basis may be replaced to 0 according to a value K.

The zero padding is not limited only to the last K bits. It may be applied to first K bits, or may be applied to middle bits.

A length of the extended RM basis may be less than a length of the reference RM basis. That is, K may have a minus value. If K has the minus value, truncation may be performed on the reference RM basis. The truncation may be performed in a first, last, or middle portion of the reference RM basis. For example, assume that K=−8. If $M_1$ for HARQ-ACK corresponds to $M_{i,1}=\{1100\ 1100\ 1001\ 0101\ 1010\ 0101\ 1101\ 0010\}$ of Table 1, an extended RM basis to which the truncation is applied in a last portion is $M1'=\{1100\ 1100\ 1001\ 0101\ 1010\ 0101\ 1101\ 0010\ 1100\ 1100\}$. In addition, the truncation may be applied to an extended RM basis for CSI by K-K' (herein, it is a natural number satisfying 0<=K'<K). When K'=2, if $M_3$ for CSI corresponds to $M_{i,3}=\{0011\ 1001\ 1100\ 1100\ 0110\ 0100\ 1011\ 0110\}$ of Table 1, the extended RM basis to which the truncation is applied in the last portion is $M_3'=\{0011\ 1001\ 1100\ 1100\ 0110\ 01\}$.

A wireless device performs circular repetition or zero padding (or truncation) according to UCI, while extending the length of the reference basis. The RM basis of the HARQ ACK may be extended by applying the circular repetition, and the RM basis for the CSI may be extended by applying the zero padding. The wireless device may perform channel coding on the HARQ ACK on the basis of a corresponding extended RM basis, and may perform channel coding on the CSI on the basis of a corresponding extended RM basis. The coded HARQ ACK and the coded CSI may be combined into one control sequence, and then may be transmitted through a UL channel (e.g., a PUCCH or a PUSCH).

A basis extension value may be predetermined, or may be reported by a BS to the wireless device. In addition, the basis extension value may vary for each UCI.

Figure 7:
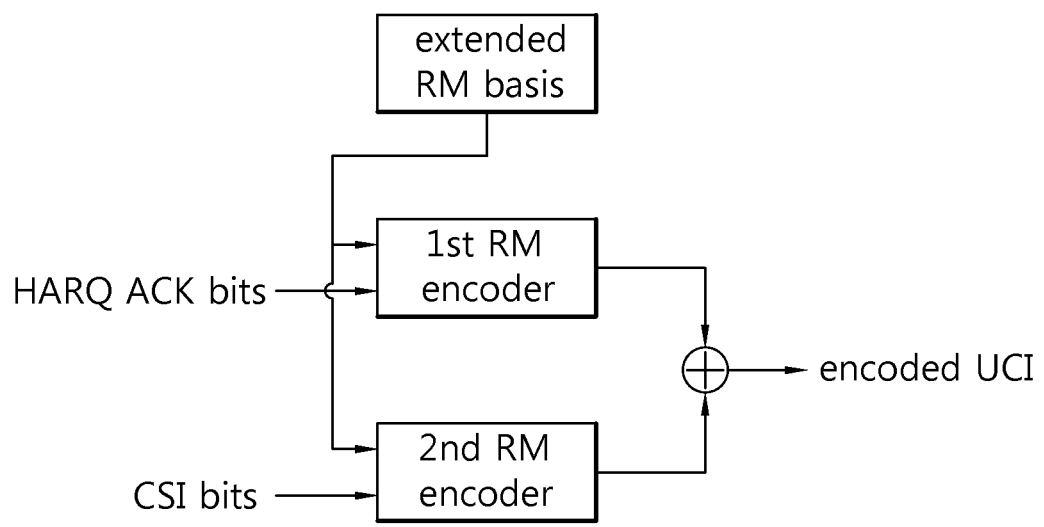
FIG. 7 shows UCI transmission using an extended RM basis.

FIG. 7 shows UCI transmission using an extended RM basis.

A $1^{st}$ RM encoder encodes HARQ ACK on the basis of an extended RM basis, and a $2^{nd}$ RM encoder encodes CSI on the basis of an extended RM basis. In this case, the extended RM basis for the HARQ ACK may be extended by applying circular repetition, and the extended RM basis for the CSI may be extended by applying zero padding.

The encoded HARQ ACK and the encoded CSI are combined in various manners to output encoded UCI. For example, if a PUCCH format 3 is used, the number of bits of the encoded UCI is 48.

Now, joint coding for a plurality of types of UCI is described.

In channel coding of a PUCCH format 3 of the existing 3GPP LTE, if the total number of bits of the UCI is greater than 11, dual RM coding is performed. This implies that a bit sequence of the UCI is input to two RM encoders by being divided into two parts.

Simply, a UCI bit sequence $u_0, u_1, \ldots, u_{A-1}$ which is an input of Equation 4 and Equation 6 may be defined as follows. $\{u_0, u_1, \ldots, u_{A-1}\} = \{AN_0, AN_1, \ldots, AN_{K-1}, CSI_0, CSI_1, \ldots\}$. That is, an HARQ ACK bit is mapped prior to a CSI bit in index.

However, performance may be aggravated in the above case since only the HARQ-ACK bit is input to one RM encoder. Although it may be considered to equally distribute the HARQ ACK bit and the CSI bit to two RM encoders, it is problematic when the HARQ ACK bit is odd.

Figure 8:
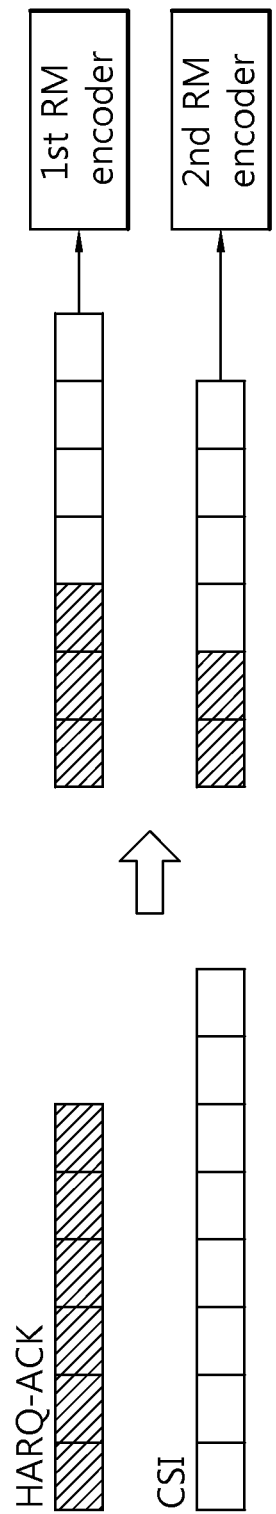
FIG. 8 shows an example of joint coding.

FIG. 8 shows an example of joint coding.

If the number of HARQ ACK bits is even, a UCI bit sequence is generated so that the same number of bits is input to two RM encoders. If the number of HARQ ACK bits is odd, one HARQ ACK bit is added to an RM encoder having a low index.

The example of FIG. 8 shows that, when the number of HARQ-ACK bits is 5 and the number of CSI bits is 8, 3 HARQ ACK bits are input to a $1^{st}$ RM encoder and 2 HARQ ACK bits are input to a $2^{nd}$ RM encoder.

Figure 9:
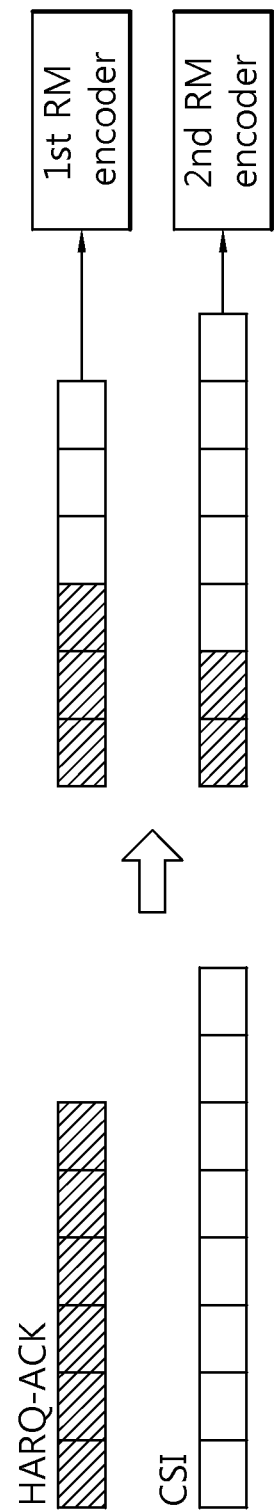
FIG. 9 shows an example of joint coding according to an embodiment of the present invention.

FIG. 9 shows an example of joint coding according to an embodiment of the present invention.

If the number of HARQ ACK bits is even, the same number of HARQ ACK bits is input to two RM encoders. If the number of HARQ ACK bits is odd, the remaining one HARQ ACK bit is input to a $1^{st}$ RM encoder (or a $2^{nd}$ RM encoder).

In addition, a CSI bit is mapped such that a final length of an encoder (herein, the $1^{st}$ RM encoder) including a relatively great number of HARQ ACK bits is relatively shorter than or equal to an input length of the $2^{nd}$ RM encoder. A case where the number of HARQ ACK bits is 5 and the number of CSI bits is 8 is shown in the example of FIG. 9.

Assume that a bit sequence which is input to the $1^{st}$ RM encoder is a $1^{st}$ input sequence, and a bit sequence which is input to the $2^{nd}$ RN encoder is a $2^{nd}$ input sequence. A less number of CSI bits may be allocated to a sequence having a greater number of HARQ ACK bits between the $1^{st}$ and $2^{nd}$ input sequences. If 3 bits of HARQ ACK are input to the $1^{st}$ input sequence and 2 bits of HARQ ACK are input to the $2^{nd}$ input sequence, the CSI bit may be less allocated to the $2^{nd}$ input sequence than the $1^{st}$ input sequence.

This is to further intensify error correction capability of an RM encoder having a great number of HARQ ACK of which an importance is high.

The aforementioned extended RM basis may be applied to the RM basis of the $1^{st}$ RM encoder and the $2^{nd}$ RM encoder.

A length of a bit sequence which is input to each RM encoder may be predetermined, or may be reported by a BS to a wireless device.

Now, separate coding is described.

The separate coding implies that different types of UCI are encoded by different component encoders. That is, in case of dual RM coding, $1^{st}$ UCI is input to a $1^{st}$ RM encoder and is then subjected to block coding, and $2^{nd}$ UCI is input to a $2^{nd}$ RM encoder and is then subjected to block coding.

If lengths of output sequences of respective component encoders are all identical (e.g., all of two RM codes use the (32, A) RM basis of Table 1), error correction capability for each UCI depends on the number of input bits. Therefore, according to the number of HARQ-ACK bits and the number of CSI bits, error correction capability of separate coding may be lower than error correction capability of joint coding.

The embodiment of the present invention proposes a criterion and method of selecting joint coding or separate coding according to a combination of the number of HARQ ACK bits and the number of CSI bits.

As shown in Table 1 and Table 2, the number of RM bases used in an RM block code is 11 in 3GPP LTE. The maximum number of input bits of respective component encoders for separate coding is equal to the number of RM bases. Therefore, it is proposed to perform separate coding according to the number of RM bases.

Although it is described hereinafter that the number of RM bases is 11 for example, this value may be greater than or less than 11.

When HARQ ACK and CSI are transmitted through a UL channel, a criterion of using separate coding is as follows.

Criterion A: A case where the number of HARQ ACK bits and the number of CSI bits are both less than or equal to 11.

Criterion B: A case where a sum of the number of HARQ ACK bits and the number of CSI bits is greater than 11.

Criterion C: A case where the number of HARQ ACK bits is less than or equal to the number of CSI bits.

Criterion D: A case where an absolute value difference of an average code rate of a component encoder when using joint coding and a minimum code rate of a component encoder when using separate coding is less than or equal to a specific value T1. Herein, the specific value T1 is predetermined or is given by a BS.

Criterion E: A case where a ratio of a code rate of a component encoder when using joint coding and a code rate of a component encoder when using separate coding is less than or equal to a specific value T2. Herein, the specific value T2 is predetermined or is given by a BS.

The separate coding may be used when at least one of the aforementioned criteria A to E is satisfied.

A reason of setting the aforementioned criteria is described below. According to the criterion A, when using separate coding, an HARQ ACK bit and a CSI bit may be allocated to different component encoders. According to the criterion B, a dual RM having better error correction capability than a single RM may be used. According to the criterion C, when using separate coding, a code rate of HARQ ACK may be less than a code rate of CSI. The criterion D is for a case where a difference between the number of CSI bits and the number of HARQ ACK bits is relatively great.

Whether to use joint coding or separate coding may be set to a wireless device by a BS.

Hereinafter, a detailed example of selecting a coding scheme according to a combination of the number of HARQ-ACK bits and the number of CSI bits is described.

Figure 10:
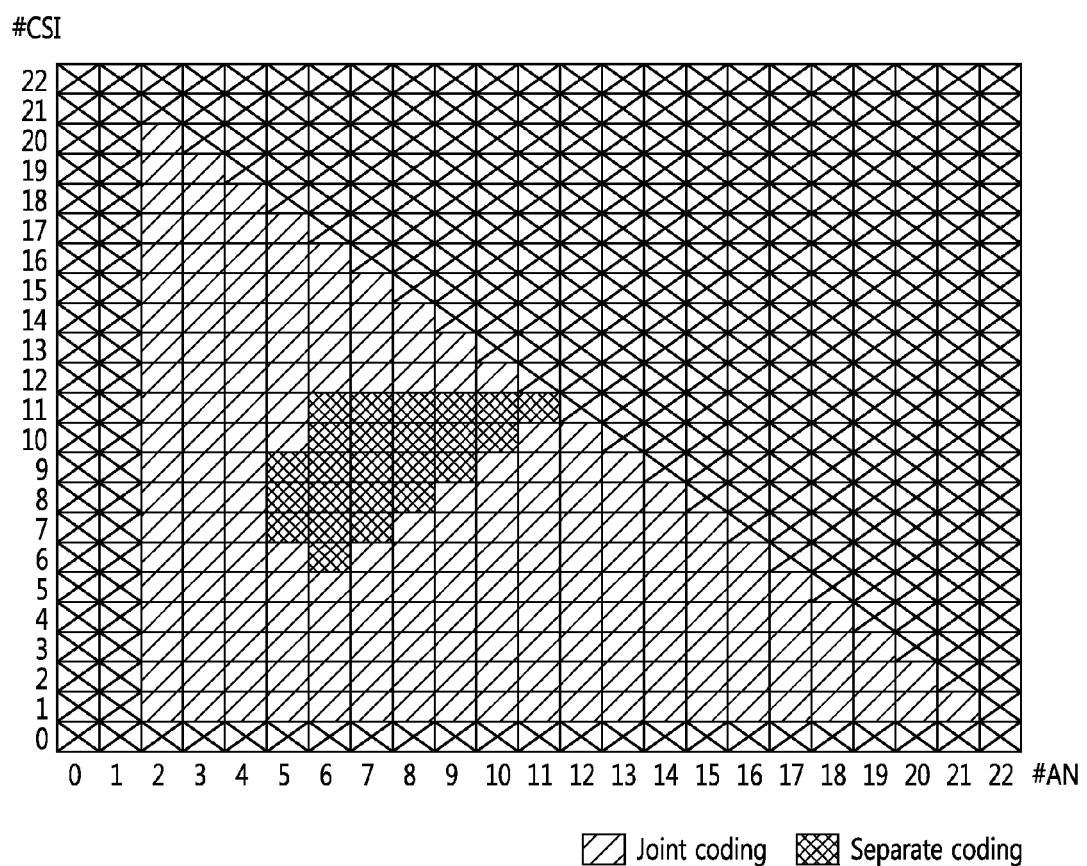
FIG. 10 shows an example of selecting a coding scheme.

FIG. 10 shows an example of selecting a coding scheme.

It is an example in which separate coding is used when the aforementioned criteria A, B, C, and D are all satisfied, and otherwise joint coding is used. In this example, 'X' implies a combination of the number of bits not considering transmission.

More specifically, if the number of HARQ ACK bits or the number of CSI bits is greater than 11, joint coding is used. Separate coding is a case where the followings are all satisfied: i) The total number of bits of HARQ ACK and CSI is greater than 11; ii) the number of HARQ ACK bits is less than or equal to the number of CSI bits; and iii) an absolute value difference of an average code rate of a component encoder when using joint coding and a minimum code rate of a component encoder when using separate coding is less than or equal to a specific value T1. Herein, it is set to T1=0.84.

Figure 11:
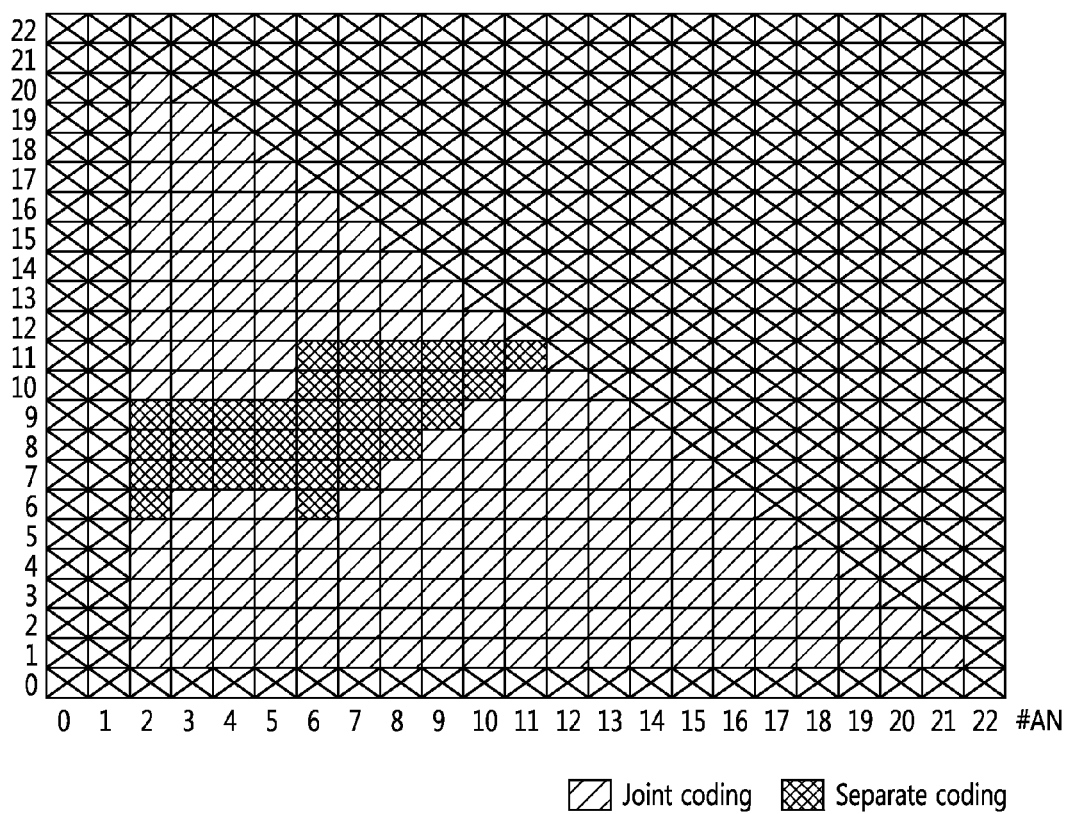
FIG. 11 shows another example of selecting a coding scheme.

FIG. 11 shows another example of selecting a coding scheme.

Herein, separate coding is used if the criteria A, B, C, and D are all satisfied, or if the criterion B is not satisfied but the criteria A, C, and E are satisfied. Otherwise, joint coding is used. In this example, 'X' implies a combination of the number of bits not considering transmission.

More specifically, joint coding is used if the number of HARQ ACK bits or the number of CSI bits is greater than 11. For separate coding, the following is satisfied: i) the number of HARQ ACK bits is less than or equal to the number of CSI bits; and ii) an absolute value difference of an average code rate of a component encoder when using joint coding and a minimum code rate of a component encoder when using separate coding is less than or equal to a specific value T1. Alternatively, the following is satisfied: i) the number of HARQ ACK bits is less than or equal to the number of CSI bits; and ii) a ratio of a code rate of a component encoder when using joint coding and a code rate of a component encoder when using joint coding is less than or equal to a specific value T2. Herein, it is set to T1=0.84 and T2=0.68.

Figure 12:
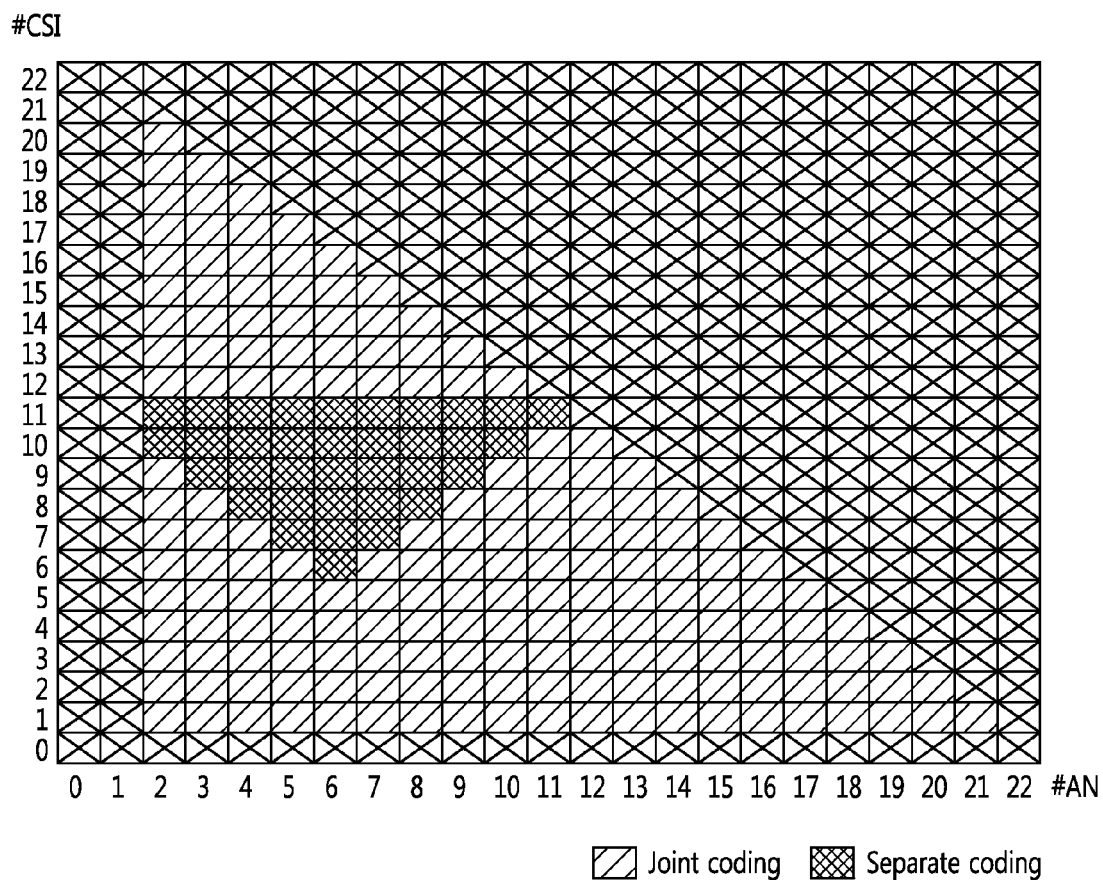
FIG. 12 shows another example of selecting a coding scheme.

FIG. 12 shows another example of selecting a coding scheme.

It is an example in which separate coding is used when the aforementioned criteria A, B, and C are all satisfied, and otherwise joint coding is used. In this example, 'X' implies a combination of the number of bits not considering transmission.

Figure 13:
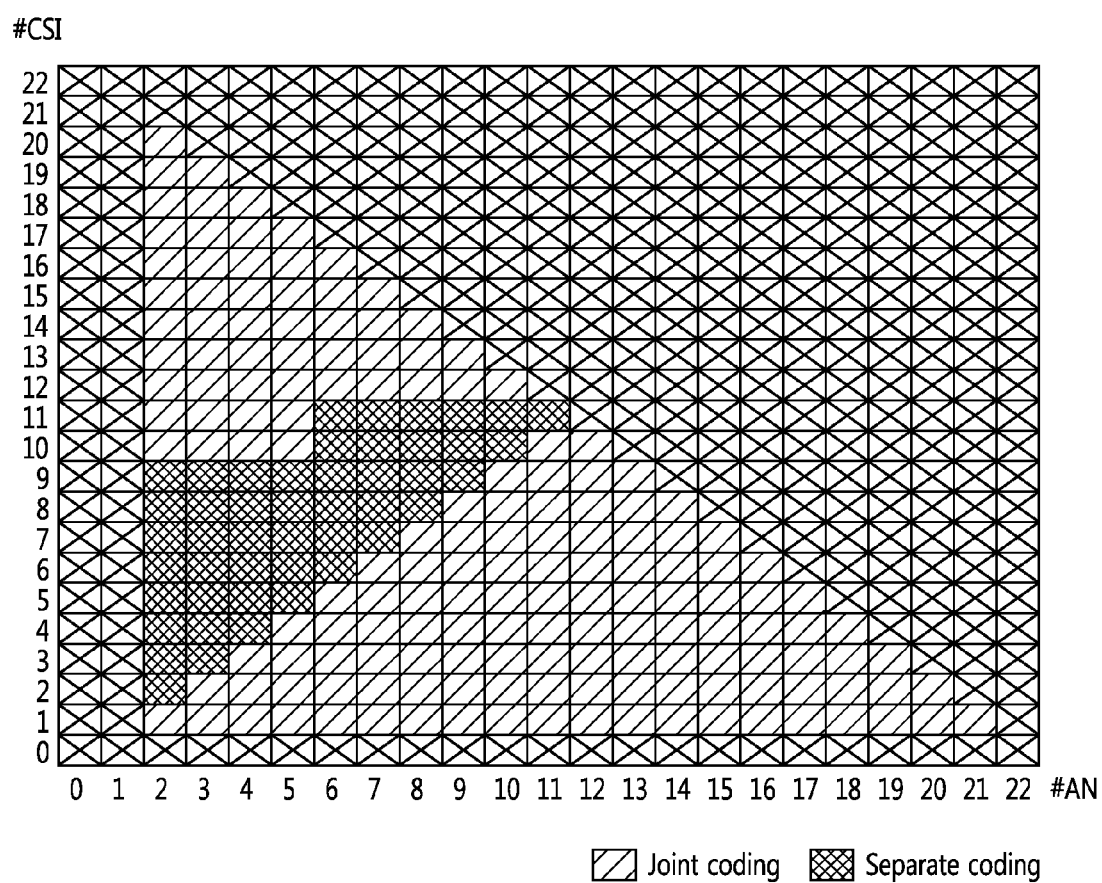
FIG. 13 shows another example of selecting a coding scheme.

FIG. 13 shows another example of selecting a coding scheme.

It is an example in which separate coding is used when the aforementioned criteria A, C, and D are all satisfied, and otherwise joint coding is used. In this example, 'X' implies a combination of the number of bits not considering transmission. Herein, it is set to T1=0.84.

Figure 14:
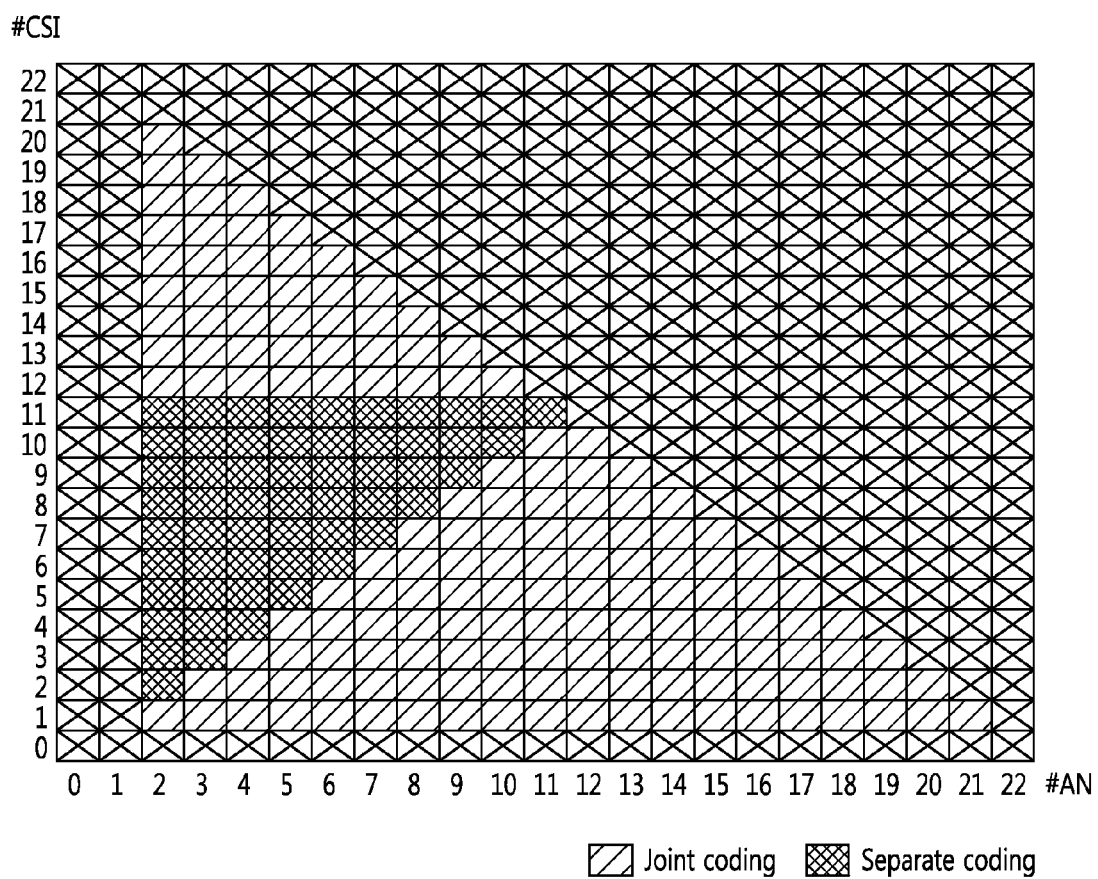
FIG. 14 shows another example of selecting a coding scheme.

FIG. 14 shows another example of selecting a coding scheme.

It is an example in which separate coding is used when the aforementioned criteria A and C are all satisfied, and otherwise joint coding is used. In this example, 'X' implies a combination of the number of bits not considering transmission.

In the criteria D and E, a code rate may be replaced with another parameter, or another parameter may be added. The parameter may include a minimum distance, an average distance, a weighted sum, etc., of a corresponding component encoder.

Figure 15:
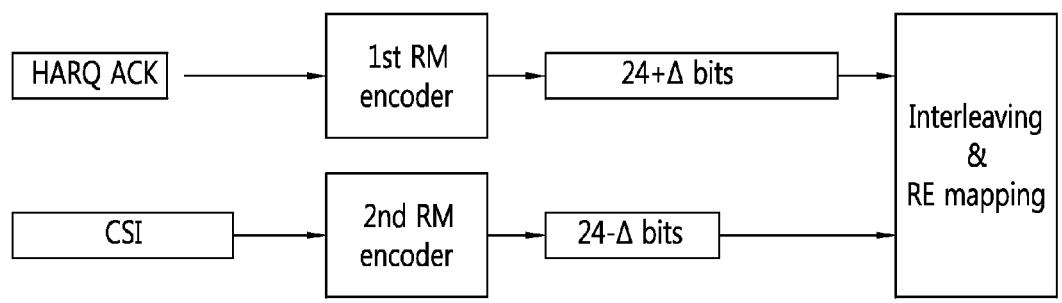
FIG. 15 shows UCI transmission according to another embodiment of the present invention.

FIG. 15 shows UCI transmission according to another embodiment of the present invention.

It shows that a length of an output sequence of each component encoder is variable. This is called variable separate coding to distinguish it from dual RM-based separate coding.

If a variable value Δ is given, for example, a length of an output sequence of a $1^{st}$ RM encoder for HARQ ACK may be increased by A, and a length of an output sequence of a $2^{nd}$ RM encoder for CSI may be decreased by A.

Capability of separate coding may be improved according to a combination of an HARQ ACK bit and a CSI bit by using a proper variable value.

The aforementioned extended RM basis may be applied to an RM basis for the $1^{st}$ RM encoder and the $2^{nd}$ RM encoder.

The variable value Δ may be predetermined, or may be reported by a BS to a wireless device. The variable value Δ may be determined according to a combination of the number of bits of HARQ ACK and CSI.

The BS may report to the wireless device whether to use joint coding or variable separate coding.

When HARQ ACK and CSI are transmitted through a UL channel, a criterion of using variable separate coding is as follows.

Criterion Y1: A case where the number of HARQ ACK bits and the number of CSI bits are both less than or equal to 11.

Criterion Y2: A case where a sum of the number of HARQ ACK bits and the number of CSI bits is greater than 11.

Criterion Y3: The number of CSI bits is used as a criterion. If the number of CSI bits is greater than a specific value, variable separate coding is used, and the other way around is also possible.

Criterion Y4: A ratio of the number of CSI bits and the number of HARQ ACK bits is used as a criterion. If the ratio is greater than a specific value, variable separate coding is used, and the other way around is also possible.

Figure 16:
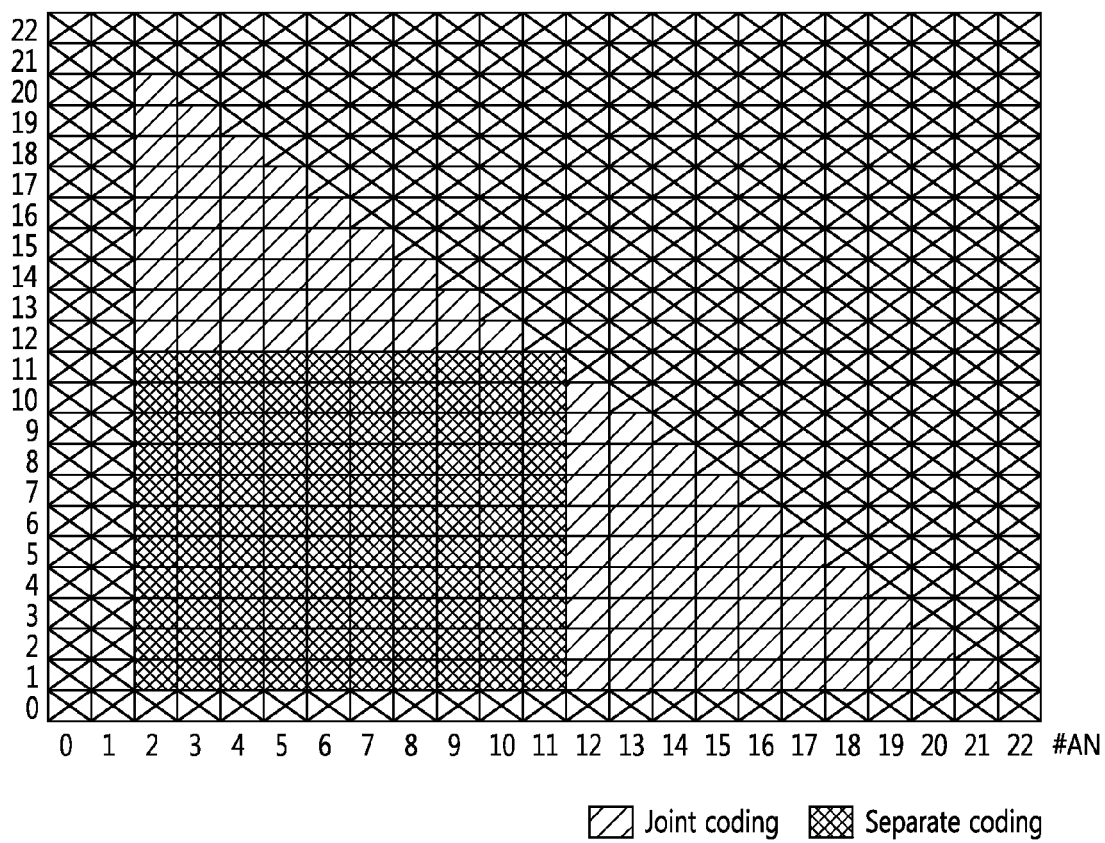
FIG. 16 shows an example of selecting variable separate coding.

FIG. 16 shows an example of selecting variable separate coding.

This is an example in which, if the aforementioned criterion Y1 is satisfied, variable separate coding is used, and otherwise joint coding is used. In this example, 'X' implies a combination of the number of bits not considering transmission.

Figure 17:
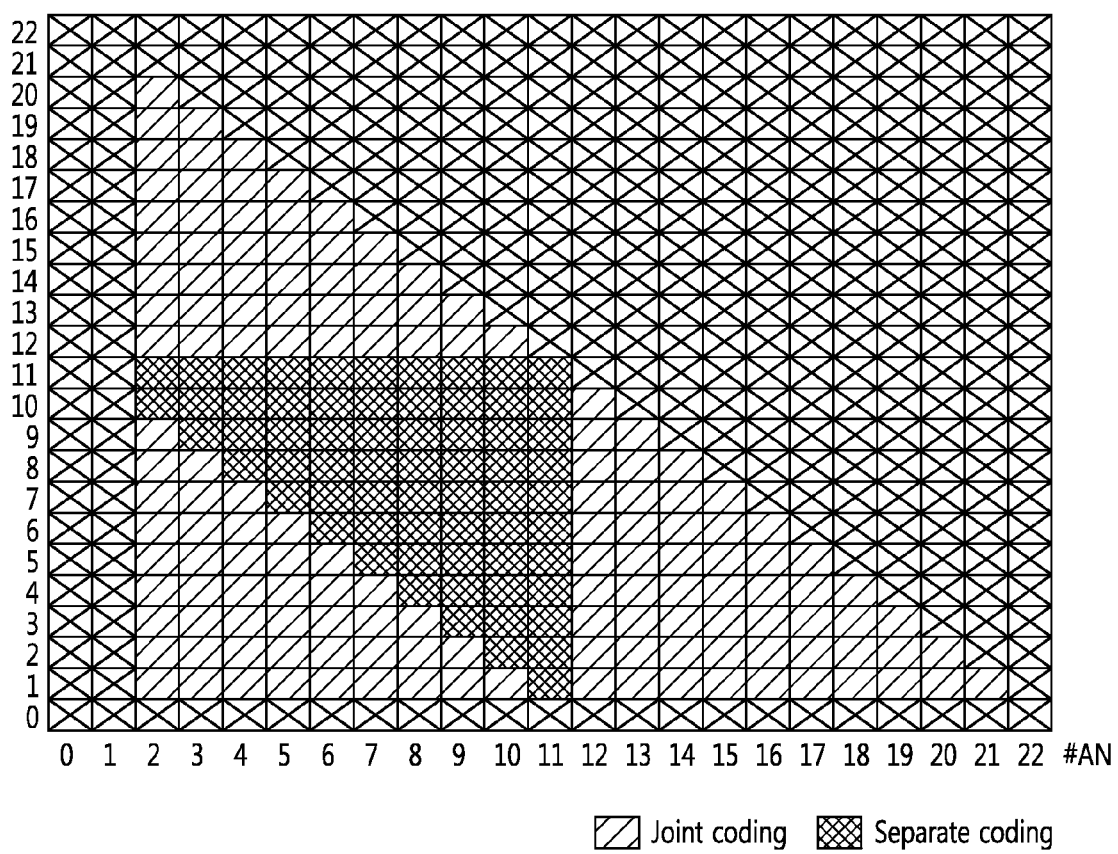
FIG. 17 shows another example of selecting variable separate coding.

FIG. 17 shows another example of selecting variable separate coding.

This is an example in which, if the aforementioned criteria Y1 and Y2 are satisfied, variable separate coding is used, and otherwise joint coding is used. In this example, 'X' implies a combination of the number of bits not considering transmission.

According to the existing 3GPP LTE, a PUCCH format 1b is defined for simultaneous transmission of HARQ ACK and CSI. There is a case where transmission of a PUCCH format 3 is not allowed even though the PUCCH format 3 for providing a greater payload is provided.

HARQ ACK may be multiplexed with a PUCCH format 2 used in CSI transmission. For example, assume that the number of bits of HARQ ACK is 4 bits. 2 bits are multiplexed to a reference signal of a PUCCH format, and the remaining 2 bits are used to perform joint coding with CSI. Joint coding may perform (20, 13) RM coding. The HARQ ACK multiplexed to the reference signal may be for a primary cell, and the HARQ ACK subjected to joint coding may be for a secondary cell.

When a plurality of types of UCI is multiplexed to a UL channel, a coding scheme may be selected according to a bit combination of corresponding UCI. Decoding capability deterioration of specific UCI caused by multiplexing with another UCI can be avoided.

Although UCI transmission is described in the aforementioned embodiments, the present invention is also applicable to transmission of downlink control information.

Figure 18:
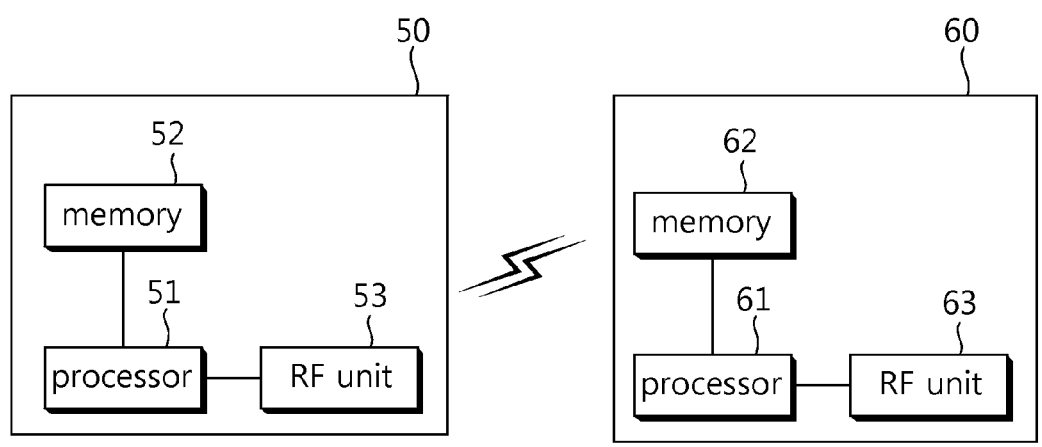
FIG. 18 is a block diagram showing a wireless communication system according to an embodiment of the present invention.

FIG. 18 is a block diagram showing a wireless communication system according to an embodiment of the present invention.

A BS 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal. The processor 51 implements the proposed functions, procedures, and/or methods. In the aforementioned embodiment, an operation of the BS may be implemented by the processor 51. The processor 51 may receive UCI, and may decode the UCI. Alternatively, if the aforementioned embodiment is applied to downlink control information transmission, the processor 51 may implement the aforementioned embodiment to the downlink control information transmission.

A wireless device 60 includes a processor 61, a memory 62, and an RF unit 63. The memory 62 is coupled to the processor 61, and stores a variety of information for driving the processor 61. The RF unit 63 is coupled to the processor 61, and transmits and/receives a radio signal. The processor 61 implements the proposed functions, procedures, and/or methods. In the aforementioned embodiment, an operation of the wireless device may be implemented by the processor 61. The processor 61 may implement UCI encoding and UCI transmission.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method for transmitting uplink control information in a wireless communication system, the method comprising:
encoding first uplink control information based on a first Reed-Muller (RM) basis by a first RM encoder;
encoding second uplink control information based on a second RM basis by a second RM encoder;
generating multiplexed control information by multiplexing the first and second uplink control information; and
transmitting the multiplexed control information through an uplink channel,
wherein if criterion A, criterion B, criterion C, criterion D and criterion E are all satisfied, a separate coding is used, and wherein if criterion A, criterion B, criterion C, criterion D and criterion E are not all satisfied, a joint coding is used,
wherein the criterion A is a case where a number of hybrid automatic repeat request (HARQ) positive-acknowledgement (ACK)/negative-acknowledgement (NACK) bits and a number of channel state information (CSI) bits are both less than or equal to a first predetermined value,
wherein the criterion B is a case where a sum of the number of the HARQ ACK/NACK bits and the number of the CSI bits is greater than the first predetermined value,
wherein the criterion C is a case where the number of the HARQ ACK/NACK bits is less than or equal to the number of the CSI bits,
wherein the criterion D is a case where an absolute value difference between an average code rate of the first RM encoder and the second RM encoder when using the joint coding and a minimum code rate of the first RM encoder and the second RM encoder when using the separate coding is less than or equal to a second predetermined value, and
wherein the criterion E is a case where a ratio of a code rate of the first RM encoder and the second RM encoder when using the joint coding and a code rate of the first RM encoder and the second RM encoder when using the separate coding is less than or equal to a third predetermined value,
wherein if the separate coding is used, the first uplink control information includes the HARQ ACK/NACK bits and the second uplink control information includes the CSI bits, and
wherein if the joint coding is used, the first uplink control information includes a first portion of the HARQ ACK/NACK bits and a first portion of the CSI bits and the second uplink control information includes a second portion of the HARQ ACK/NACK bits and a second portion of the CSI bits.

2. The method of claim 1, wherein the first RM basis and the second RM basis are acquired by extending a reference RM basis.

3. The method of claim 2, wherein the first RM basis is acquired by circularly repeating the reference RM basis.

4. The method of claim 3, wherein the second RM basis is acquired by adding zero padding to the reference RM basis.

5. The method of claim 4, wherein a length of the reference RM basis is N,
wherein a length of the first RM basis is N+K, and
wherein a length of the second RM basis is N+K, where N is a natural number, and K is an integer.

6. The method of claim 2, wherein a number of bits of the first uplink control information and a number of bits of the second uplink control information are greater than a number of bits of reference RM basis codes.

7. The method of claim 1, wherein the uplink channel is a physical uplink control channel (PUCCH) or a physical uplink shared channel (PUSCH).

8. An apparatus for transmitting uplink control information in a wireless communication system, the apparatus comprising:
a radio frequency (RF) unit that transmits and receives a radio signal; and
a processor coupled to the RF unit,
wherein the processor is configured to:
encode first uplink control information based on a first Reed-Muller (RM) basis by a first RM encoder,
encode second uplink control information based on a second RM basis by a second RM encoder,
generate multiplexed control information by multiplexing the first and second uplink control information, and transmit the multiplexed control information through an uplink channel, wherein if criterion A, criterion B, criterion C, criterion D and criterion E are all satisfied, a separate coding is used, and wherein if criterion A, criterion B, criterion C, criterion D and criterion E are not all satisfied, a joint coding is used, wherein the criterion A is a case where a number of hybrid automatic repeat request (HARQ) positive-acknowledgement (ACK)/negative-acknowledgement (NACK) bits and a number of channel state information (CSI) bits are both less than or equal to a first predetermined value, wherein the criterion B is a case where a sum of the number of the HARQ ACK/NACK bits and the number of the CSI bits is greater than the first predetermined value, wherein the criterion C is a case where the number of the HARQ ACK/NACK bits is less than or equal to the number of the CSI bits, wherein the criterion D is a case where an absolute value difference between an average code rate of the first RM encoder and the second RM encoder when using the joint coding and a minimum code rate of the first RM encoder and the second RM encoder when using the separate coding is less than or equal to a second predetermined value, and wherein the criterion E is a case where a ratio of a code rate of the first RM encoder and the second RM encoder when using the joint coding and a code rate of the first RM encoder and the second RM encoder when using the separate coding is less than or equal to a third predetermined value, wherein if the separate coding is used, the first uplink control information includes the HARQ ACK/NACK bits and the second uplink control information includes the CSI bits, and wherein if the joint coding is used, the first uplink control information includes a first portion of the HARQ ACK/NACK bits and a first portion of the CSI bits and the second uplink control information includes a second portion of the HARQ ACK/NACK bits and a second portion of the CSI bits.

9. The apparatus of claim 8, wherein the first RM basis and the second RM basis are acquired by extending a reference RM basis.

10. The apparatus of claim 9, wherein the first RM basis is acquired by circularly repeating the reference RM basis.

11. The apparatus of claim 10, wherein the second RM basis is acquired by adding zero padding to the reference RM basis.

12. The method of claim 1, wherein when the number of the HARQ ACK/NACK bits is even, the number of bits in the first portion of the HARQ ACK/NACK bits is equal to the number of bits in the second portion of the HARQ ACK/NACK bits, and the number of bits in the first portion of the CSI bits is equal to number of the bits in the second portion of the CSI bits, and wherein when the number of the HARQ ACK/NACK bits is odd, the number of the bits in the first portion of the HARQ ACK/NACK bits is greater than the number of the bits in the second portion of the HARQ ACK/NACK bits, and the number of the bits in the first portion of the CSI bits is less than the number of the bits in the second portion of the CSI bits.

13. The apparatus of claim 8, wherein when the number of the HARQ ACK/NACK bits is even, the number of bits in the first portion of the HARQ ACK/NACK bits is equal to the number of bits in the second portion of the HARQ ACK/NACK bits, and the number of bits in the first portion of the CSI bits is equal to the number of bits in the second portion of the CSI bits, and wherein when the number of the HARQ ACK/NACK bits is odd, the number of the bits in the first portion of the HARQ ACK/NACK bits is greater than the number of the bits in the second portion of the HARQ ACK/NACK bits, and the number of the bits in the first portion of the CSI bits is less than the number of the bits in the second portion of the CSI bits.

* * * * *